(12) United States Patent
Douglas et al.

(10) Patent No.: US 11,276,994 B2
(45) Date of Patent: Mar. 15, 2022

(54) REJUVENATION OF SUBSEA ELECTRICAL CABLE INSULATION

(71) Applicant: Viper Innovations Ltd, Bristol (GB)

(72) Inventors: Neil Irwin Douglas, Clevedon (GB);
Paul Robert Overton, Portishead (GB);
Alistair John Wright, Bristol (GB)

(73) Assignee: Viper Innovations Ltd, Portishead (GB)

( * ) Notice: Subject to any disclaimer, the term of this patent is extended or adjusted under 35 U.S.C. 154(b) by 429 days.

(21) Appl. No.: 16/238,855

(22) Filed: Jan. 3, 2019

(65) Prior Publication Data
US 2019/0190242 A1 Jun. 20, 2019

Related U.S. Application Data

(63) Continuation of application No. 14/831,366, filed on Aug. 20, 2015, now Pat. No. 10,199,810, which is a
(Continued)

(30) Foreign Application Priority Data

Feb. 20, 2013 (GB) .................................. 1302938
Aug. 21, 2014 (GB) .................................. 1414897

(51) Int. Cl.
*H02G 1/16* (2006.01)
*C23F 11/00* (2006.01)
(Continued)

(52) U.S. Cl.
CPC ............... *H02G 1/16* (2013.01); *C23F 11/00* (2013.01); *H02G 1/10* (2013.01); *H02G 9/02* (2013.01); *H02G 9/12* (2013.01); *Y10T 29/49119* (2015.01)

(58) Field of Classification Search
CPC . H02G 9/02; H02G 9/025; H02G 1/16; C23F 11/00; Y10T 29/49718
See application file for complete search history.

(56) References Cited

U.S. PATENT DOCUMENTS 2,149,448 A 3/1939 Lederer et al.
3,403,089 A 9/1968 Joyce
(Continued)

FOREIGN PATENT DOCUMENTS

DE    10106200    9/2002
EP     0654673    5/1995
(Continued)

OTHER PUBLICATIONS

International Search Report for PCT/GB2014/050430 dated May 19, 2014.
(Continued)

*Primary Examiner* — Jeffrey T Carley
(74) *Attorney, Agent, or Firm* — Andrus Intellectual Property Law, LLP

(57) ABSTRACT

Described is a cable rejuvenation apparatus for a cable used in a subsea environment. The apparatus applies a bias signal to a conducting element of the cable, the bias signal being selected to improve the insulation properties of the cable. The bias signal is generated by a bias signal generator that includes a voltage source that generates a bias voltage having a time varying component. The bias voltage promotes an electrochemical reaction between the conducting element and the salt containing liquid of the subsea environment resulting in the formation of a barrier material at the fault location restricting further leakage current flow and enhancing the insulation resistance of the cable. The bias signal is a voltage selected such that the electrochemical
(Continued)

reaction promoted by the bias voltage maintains the presence of the barrier material at the fault location.

12 Claims, 5 Drawing Sheets

Related U.S. Application Data continuation-in-part of application No. PCT/GB2014/050430, filed on Feb. 14, 2014.

(51) Int. Cl.
  *H02G 1/10* (2006.01)
  *H02G 9/02* (2006.01)
  *H02G 9/12* (2006.01)

(56) References Cited

U.S. PATENT DOCUMENTS

| | | | |
|---|---|---|---|
| 3,892,646 A | 7/1975 | Lazzarini et al. | |
| 3,898,145 A | 8/1975 | Davis et al. | |
| 4,711,022 A | 12/1987 | Freeman et al. | |
| 4,752,997 A | 6/1988 | Freeman et al. | |
| 5,883,517 A * | 3/1999 | Broyde | H04B 10/07 |
| | | | 324/522 |
| 7,353,601 B1 | 4/2008 | Bertini | |
| 7,976,747 B2 | 6/2011 | Bertini | |
| 2003/0188974 A1* | 10/2003 | Padhi | H01L 21/2885 |
| | | | 205/241 |
| 2009/0013379 A1 | 5/2009 | Bertini | |
| 2010/0122453 A1 | 5/2010 | Bertini | |
| 2010/0131215 A1* | 5/2010 | Kim | G01R 31/52 |
| | | | 702/58 |
| 2010/0220431 A1 | 9/2010 | Douglas | |

FOREIGN PATENT DOCUMENTS

| | | |
|---|---|---|
| EP | 2339359 | 6/2011 |
| WO | 2010136284 | 12/2010 |

OTHER PUBLICATIONS

Search Report for GB1402587.8 dated Feb. 21, 2014.
Examination Report for GB1504747.5 dated May 14, 2015.
Patent Examination Report No. 1 for Australian Patent Application No. 2015213392 issued Apr. 29, 2016.

* cited by examiner

REJUVENATION OF SUBSEA ELECTRICAL CABLE INSULATION

CROSS-REFERENCE TO RELATED APPLICATIONS

The present application is a continuation of U.S. patent application No. 14/831,366, filed Aug. 20, 2015 and issued as U.S. Pat. No. 10199810, which is a Continuation-In-Part of International Application No. PCT/GB2014/050430, filed Feb. 14, 2014, which international application was published on Aug. 28, 2014, as International Publication WO2014/128439. The International Application claims priority of British Patent Application 1302938.4, filed Feb. 20, 2013, the contents of which are incorporated herein by reference in their entireties.

The present application also claims priority of British Patent Application No 1414897.7, filed Aug. 21, 2014, the content of which is incorporated herein by reference in its entirety.

FIELD

This invention relates to a method of rejuvenating parts of an electrical subsea distribution system, and to an associated apparatus. The invention relates, in particular, to a method and apparatus for improving the electrical insulating properties of a cable of such a system, for example a subsea umbilical cable, a jumper, a flying lead or the like. The method uses a rejuvenating process that enhances or restores the insulation resistance of at least parts of the cable and the associated connectors. The term cable as used herein should be interpreted to include the connectors associated therewith. The cable may comprise, for example, part of a subsea hydrocarbon production system. However, the invention is not restricted in this regard and could be used for a number of other purposes, for example in association with offshore windfarms, subsea communications cables, subsea power cables or other cables located in a subsea environment.

BACKGROUND

It is frequently necessary to sleeve an electrically conducting wire with an electrically insulating material, for example to prevent electrical coupling between adjacent wires within a cable, or to a conducting medium within which the wire is disposed. It is important that the insulation material performs adequately in the task, and one important figure of merit is the insulation resistance of the insulating material.

In subsea applications, insulated wires are used in the conductive medium of seawater, and the insulation material prevents electrical losses thereto, as well as fulfilling a number of other functions. Subsea cable insulation may degrade over time, with the insulation resistance eventually becoming unacceptably low. One cause of failure is seawater ingress into and through the insulation due to, for example, long term degradation of the insulating material, manufacturing faults or other means. Such a failure may result in short circuits between conductors and/or current flows from live conductors to earth. However, damage or other faults may lead to a reduction in insulation resistance.

In subsea hydrocarbon production systems, these types of failure can eventually lead to total loss of subsea electrical control and hence to an unplanned shutdown of production from one or more wells. Present solutions to the problem rely heavily on intervention to disconnect subsea equipment, cables and connectors and to replace with new items. There are a number of known devices, such as the arrangement described in GB2476152, that can be used to monitor the insulation resistance of a cable and to provide a warning to the user that the cable insulation material has degraded and a fault has occurred or is developing. Upon identification that the insulation has degraded or a fault has occurred, typical solutions rely heavily on intervention to disconnect subsea equipment, cables and connectors and to replace the removed equipment with new items Such intervention is very inefficient, time consuming and expensive.

WO2010/136284 describes an arrangement for monitoring the insulation resistance of an ungrounded electrical network such as that found in electric and hybrid vehicles. It involves injecting a test voltage including an AC component and a DC component into the network. Appropriate monitoring allows measurements of the insulation resistance to be made.

A need exists for a method and apparatus that is capable of improving the insulation properties of cables, particularly subsea cables as used in a subsea electrical distribution system. Whilst as mentioned above WO2010/136284 describes an arrangement for monitoring insulation resistance (albeit in an application far removed from the present invention), it does not provide teaching regarding enhancement of or rejuvenation of the electrical insulating properties of a network or parts thereof.

US2010/0122453 and US2009/0133799 both describe arrangements intended for use in the rejuvenation of cables. However, neither relates to the rejuvenation of subsea systems or addresses the issues peculiar to subsea located equipment.

SUMMARY

According to the present invention, there is provided a rejuvenation method for a cable used in a subsea environment, the method comprising applying a bias signal to a conducting element of the cable, the bias signal being dynamically controlled and selected to improve the insulation properties of the cable.

According to another aspect of the invention there is provided a rejuvenation method for a cable used in a subsea environment, the method comprising applying a bias signal to a conducting element of the cable, the bias signal being selected so as to improve the insulation properties of the cable, the bias signal being selected such that, in the event of an electrical leakage current of predetermined magnitude flowing between the conducting element and a salt containing liquid of the subsea environment at a fault location, a voltage is applied promoting an electrochemical reaction between the conducting element and the liquid and resulting in the formation of a barrier material at the fault location restricting further leakage current flow and so enhancing the insulation resistance of the cable, the bias signal being selected such that the electrochemical reaction promoted by the bias signal maintains the presence of the barrier material at the fault location.

The bias signal may be dynamically controlled and may comprise a bias voltage, preferably applied between ground and the conducting element. It includes a DC component. It may additionally have a time varying component. Where a time varying component is present, it may be of sinusoidal, square, or triangular waveform, for example.

The bias signal may alternatively comprise a bias current.

The bias signal is preferably selected such that, in the event of an electrical current flowing between the conducting element and a salt containing liquid of the subsea environment, an electrochemical reaction is promoted resulting in the generation of a barrier material restricting further leakage current flow and so enhancing the insulation resistance of the cable.

An electro-phoresis effect or other electro-kinetic effect may additionally or alternatively result from the application, of the bias signal to enhance the insulation resistance at the fault location.

The invention also relates to an apparatus configured to perform the method described hereinbefore.

BRIEF DESCRIPTION OF THE DRAWINGS

The invention will further be described, by way of example, with reference to the following drawings, in which.

DETAILED DESCRIPTION OF THE DRAWINGS

Figure 1:
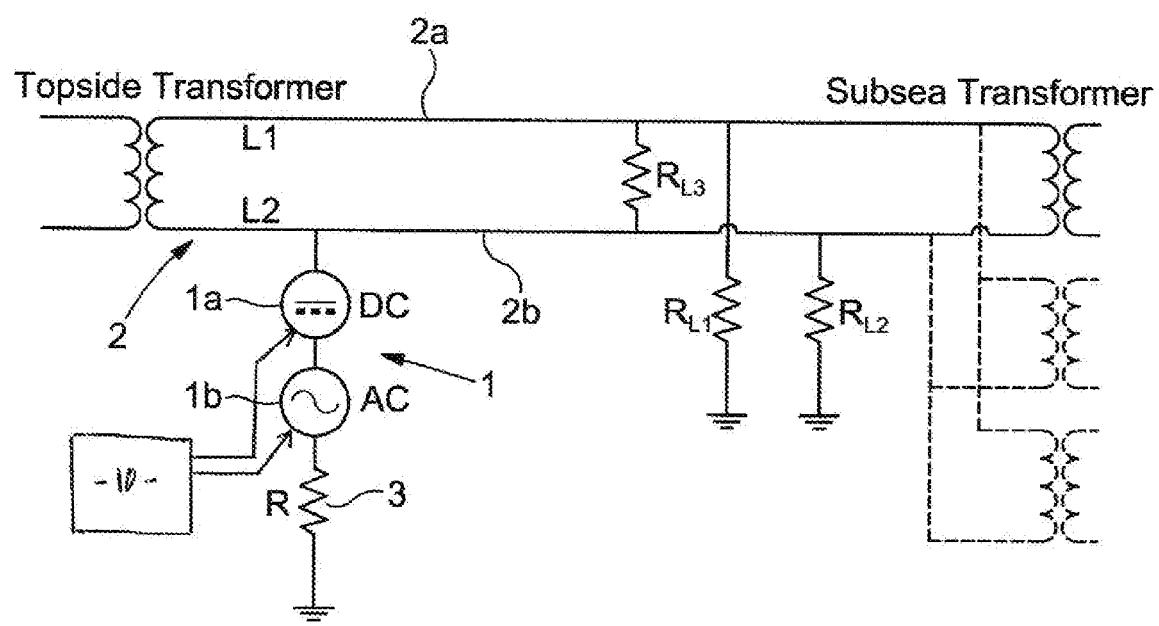
FIG. 1 is a simplified schematic diagram of an apparatus according to an embodiment of the invention.
Figure 2:
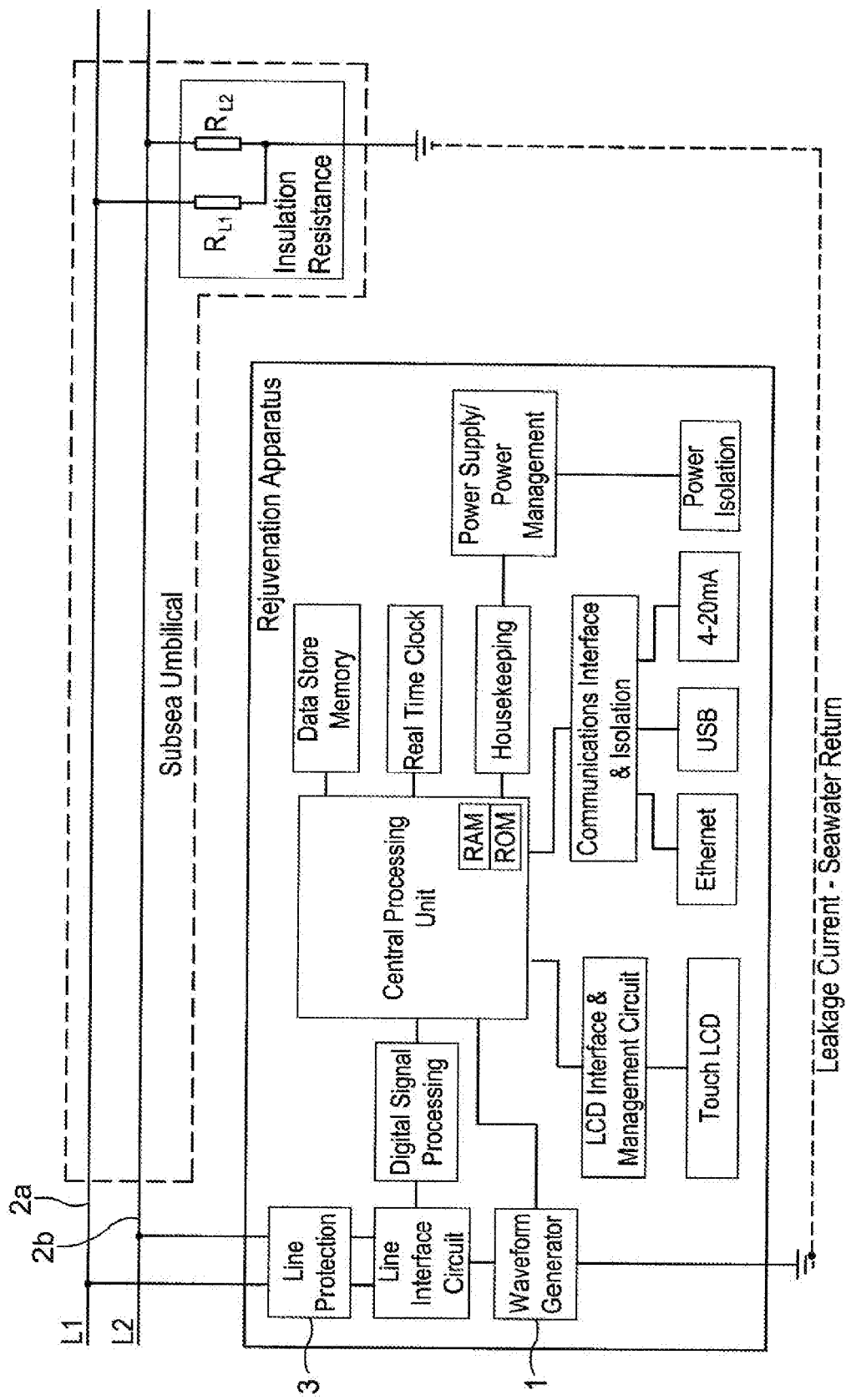
FIG. 2 is a diagram illustrating the apparatus of FIG. 1 in greater detail.

FIGS. 1 and 2 show a cable rejuvenation apparatus comprising a voltage source 1 (including a part 1a arranged to output a DC signal and a part 1b arranged to output a time varying component upon which the DC signal is superimposed) and a current limiting resistor 3. The voltage source 1 is connected to the conducting elements 2a, 2b of a subsea cable, umbilical or other part 2 of a subsea electrical distribution system. The system is illustrated as including two conducting elements 2a, 2b coupled to one another and coupled to other parts of the system by way of transformers. Resistances $R_{L1}$ and $R_{L2}$ denote the insulation resistance associated with the insulation of each conducting element 2a, 2b, and $R_{L3}$ denotes the resistance between the conducting elements 2a, 2b. Clearly, in the event of degradation of the insulation resistance as outlined hereinbefore, the values of the insulation resistances will reduce and so the leakage currents arising in normal use of the subsea cable or the like will increase.

The application of the bias signal between ground and one of the elements 2a or 2b, in accordance with the invention, the bias signal being generated and applied by the voltage source 1, under the control of a control unit 10, will result in an electrical current of predetermined magnitude flowing through the insulation resistance ($R_{L1}$ and/or $R_{L2}$ etc) and a specific voltage will be applied across the insulation resistance ($R_{L1}$ and/or $R_{L2}$ etc) which, in turn, will promote an electrochemical reaction resulting in the formation of a barrier material salt which will accumulate, initially, primarily as a solid in the vicinity of the point at which the insulation resistance is reduced, referred to hereinafter as the fault location. This forms a barrier which, in turn, reduces the leakage current and, thus, increases the insulation resistance. Where the conducting elements 2a, 2b are of copper form, the barrier material salt will typically be CuCl.

The mechanism by which this reaction occurs is described in further detail below.

The electrochemical reaction is promoted by tuning of the voltage source 1 to ensure the application of a reaction initiation voltage of between 4 and 7 W across the resistance $R_{L1}$ and/or $R_{L2}$ at the fault location. The level and makeup of the reaction initiation voltage required may be dependent on a number of factors such as the starting insulation resistance, the salinity of the water of the subsea environment, the acidity of the water, the cross-sectional area of the copper conductor, the construction of the cable assembly, the rate of CuCl production required to form the barrier, etc, and may be selected accordingly in order to optimise the operating parameters. It has been found that in some circumstances the application of too low a reaction initiation voltage or the application of too great a reaction initiation voltage may result in the electrochemical reaction not occurring or occurring at an insufficient rate to maintain the presence of the barrier material. It is important that the reaction promoted by the bias signal, resultant electrical current of specific magnitude and the specific voltage applied across the insulation resistance ($R_{L1}$ and/or $R_{L2}$ etc) maintains the presence of the barrier material in the fault location, replacing, for example, generated barrier material that may dissolve in the water of the subsea environment or otherwise be removed from the fault location.

The cable rejuvenation apparatus may be a suitably programmed Viper Line Insulation Monitor device known as a V-LIFE device and available from Viper Subsea. However, this need not always be the case.

Figure 3:
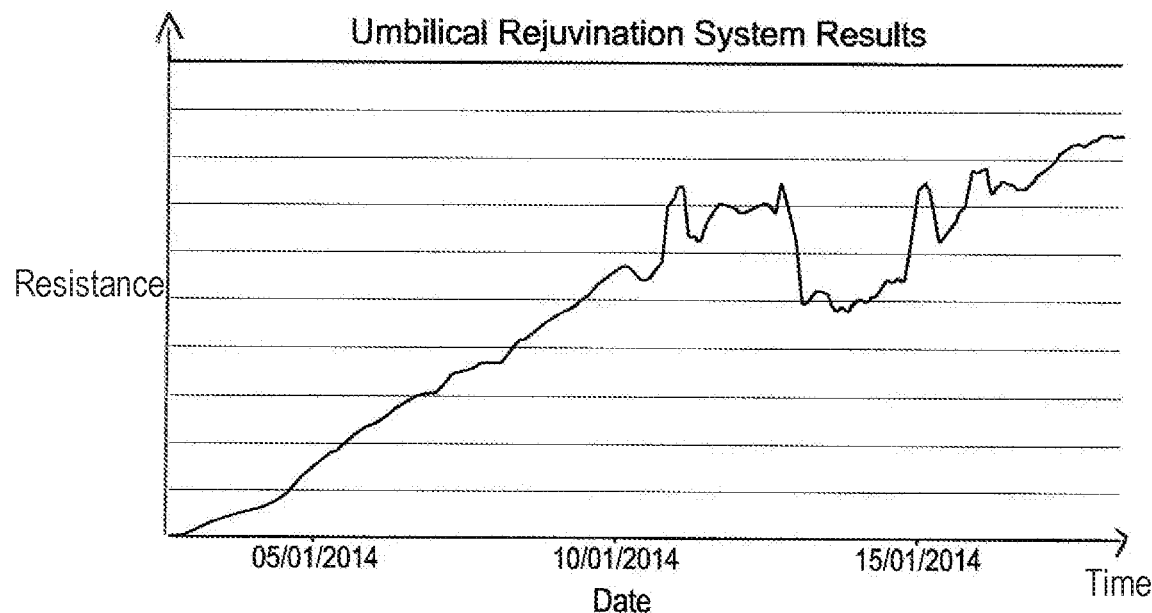
FIG. 3 is a graph showing, insulation resistance plotted against time, showing the improvement in the insulation properties of a cable over time as a method according to an embodiment of the invention is used thereon.

The present applicant has identified and proven that the insulation properties of a subsea cable can be markedly improved by applying a cable healing or rejuvenation method according to an embodiment of the invention. FIG. 3 shows the results of a trial in which a suitably programmed V-LIFE device was connected to a subsea cable that was known to have poor insulation properties. The measured insulation resistance was approximately 160 kΩ before the cable rejuvenation method was applied.

During the period of the trial, the V-LIFE device was configured as a cable rejuvenation apparatus according to an embodiment of the invention, arranged to apply a bias voltage to the conducting elements 2a, 2b of the cable selected to improve the electrical insulation properties of the cable. The V-LIFE was configured to repeatedly apply a bias voltage to the cable and, whilst the bias signal was being applied, to conduct a sequence of measurements upon the cable. As described below, whilst the bias signal was applied, this caused an electrical current of specific magnitude to flow through the insulation resistance which resulted in a specific voltage to be applied across the insulation resistance ($R_{L1}$ and/or $R_{L2}$ etc) which, in turn, promoted an electrochemical reaction serving to improve or enhance the insulation resistance of the cable. Over a majority of the time the V-LIFE was configured to operate in a rejuvenation and measurement phase in which whilst the bias signal was applied to promote the electrochemical reaction and so serve to rejuvenate the cable, the V-LIFE device further operated to monitor the insulation resistance. During this phase, the bias voltage was connected via the current limiting resistor 3. The presence of the current limiting resistor provides a potential divider arrangement with the insulation resistance ($R_{L1}$ and/or $R_{L2}$ etc) which controls the electrical current flowing through the insulation resistance to be of specific magnitude. It also ensures that the applied current resulting from the application of the bias voltage will be maintained at an acceptably low level even if the insulation resistance of the cable is low.

The graph of FIG. 3 shows insulation resistance measurements taken from the V-LIFE device over a period from the 2 Jan. 2014 to 21 Jan. 2014 during which tests were conducted to confirm the effectiveness of the invention. FIG. 3 shows the insulation resistance markedly improving over this period with a substantially linear trend, up to a maximum of 100 MΩ. As mentioned above, the rejuvenation effect stems from an electrochemical reaction occurring between the material of the conducting elements 2a, 2b of the cable and the salts, primarily NaCl, present within the seawater in which the system including the cable 2, or at least part thereof, is located, the reaction being promoted by the application of the bias voltage. In the trial mentioned above, the conducting elements 2a, 2b were of copper form.

Figure 6A:
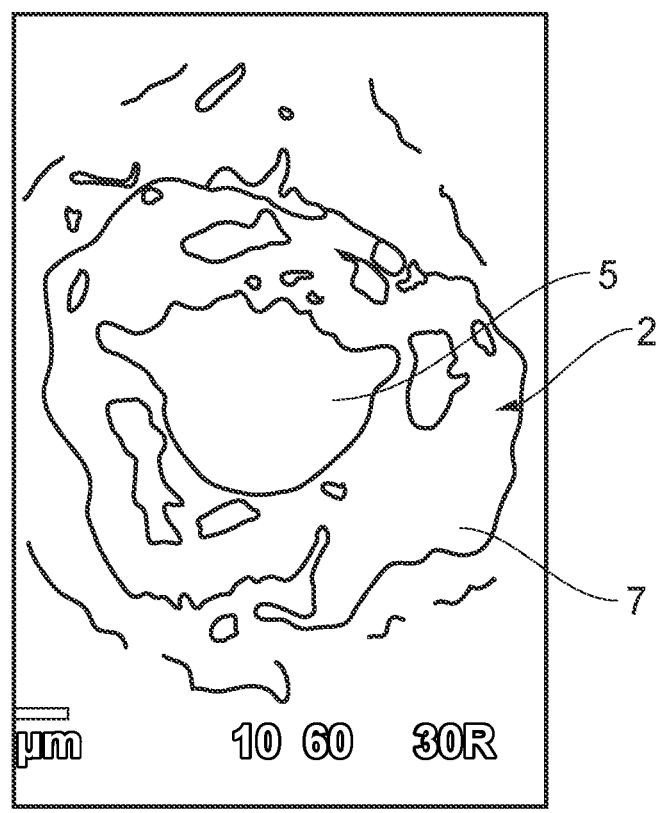
FIGS. 6a and 6b are scanning electron microscope images of part of a cable prior to and after the use of an embodiment of the invention in connection therewith.
Figure 6B:
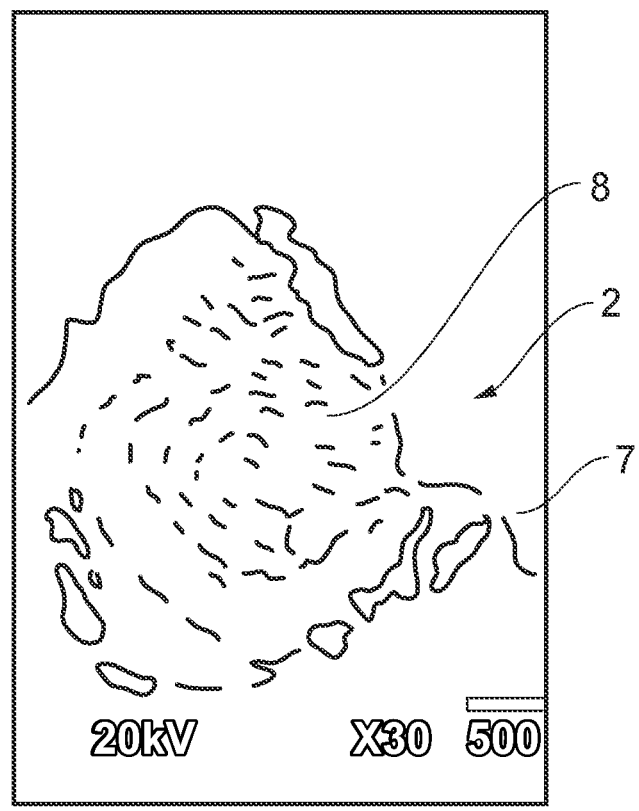

FIGS. 6a and 6b are scanning electron microscope images of a pore 5 in an actual cable 2 before and after the application of the above described method. As illustrated in FIG. 6a, prior to the application of the method, the pore 5 extends to a considerable depth and the conducting element 2a, 2b may be exposed through the insulation 7 thereof. After the application of the method, a quantity of barrier material 8 has accumulated within the pore 5, substantially filling the pore 5, restricting seawater access to the conductor 2a, 2b Whilst as described hereinbefore an initiation voltage of between 4 and 75V is applied, at least some of the benefits of the invention may be observed where the applied initiation voltage is outside of this range. For example, higher initiation voltages such as up to, say, 150V or 300V may be applied, and lower initiation voltages, for example as low as 1 or 2V may be applied.

Figure 4:
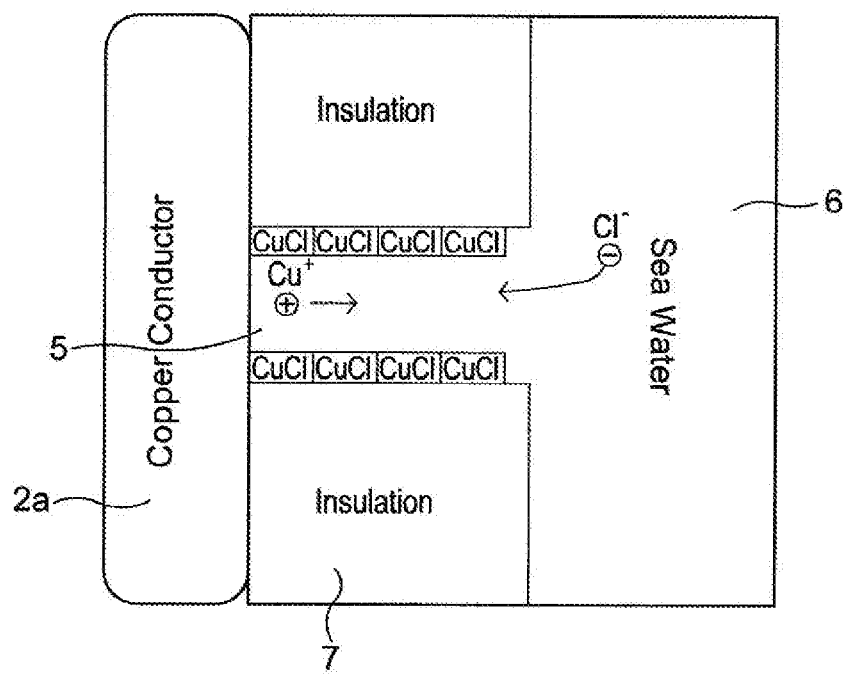
FIG. 4 is a diagram illustrating the operation of the invention.

By way of further explanation, as illustrated in FIG. 4, in the event of a failure in the insulation 7 surrounding one of the conducting elements 2a, 2b, say element 2a, one or more pores 5 may be formed in the insulation 7. The pore 5 may extend completely through the insulation 7 as illustrated or may extend only part way through the insulation 7. The application of the bias signal between ground and the element 2a will result in a specific current flow through the insulation resistance and, thus, a specific voltage across the insulation resistance promoting the production of $Cu^+$ ions which will tend to migrate towards the seawater and in the production of $Cl^-$ ions which will tend to migrate towards the element 2a, these electro-kinetic migrations (electrophoresis) result in the formation of an electrical leakage current. In addition, they will promote the formation of CuCl salt which will accumulate, initially, primarily as a solid within the pore 5 forming a barrier material impeding the aforementioned electro-kinetic migrations and so reducing the leakage current. Diffusion or convection (electro-osmosis) or a combination thereof may further assist in movement of the ions towards one another and the subsequent formation of the barrier material. By reducing the leakage current, it will be appreciated that the insulating properties of the cable 2 have been rejuvenated. In addition to collecting within the pore 5, some of the salt will tend to accumulate on the surface of the cable 2 around the pore 5.

It will be appreciated that, over time, some of the formed salt will tend to dissolve or otherwise be carried from the pore 5. Such removal will tend to result in a slight increase in the leakage current, resulting in the generation of fresh salt replacing that which has been removed. Accordingly, once the operating parameters have been optimised to promote the electro-chemical reaction, as previously disclosed, the rejuvenation of the cable is self-maintaining.

In some circumstances the electrochemical reaction also promotes the formation of $Cu_2O$ which, again, will serve as a barrier material. The formation of $Cu_2O$ occurs if the seawater present within the pore 5 becomes increasingly alkaline. The pore 5 will typically be of very small dimensions and so the flow of seawater into and from the pore 5 will be restricted. Accordingly, the make-up of the seawater within the pore 5 will change over time as the electrochemical reactions take place. The formation of $Cu_2O$ may thus be related to the spacing of the conductor 2a from, for example, a steel shielding provided around the cable 2.

The magnitude of the applied bias signal, and any time varying component thereof, are conveniently controlled by the control unit 10 by monitoring the insulation resistance of the cable and adjusting one or other or both of these parameters to optimise the insulation resistance or maintain the insulation resistance within an acceptable range. By way of example, the applied bias voltage signal may be selected so as to control the rate of the electrochemical reaction and thereby avoid or reduce to acceptable levels the generation of gases as part of the electrochemical reaction or as a result of electrolysis, and also to ensure that the barrier material is maintained at a level sufficient to maintain the insulation resistance at an acceptable level, whilst also minimising the loss of conductor material from the conductors. By measuring the insulation resistance whilst the rejuvenation method is in use, it will be appreciated that the applied bias signal can be actively and dynamically controlled to achieve optimisation of the effects mentioned above. The applied bias signal will thus vary depending upon the measured insulation resistance, and as a result damage to the conductors arising from the application of too large or too small a bias signal can be avoided or limited to an acceptable level.

The nature of the failure of insulation may take several farms. For example the insulation may degrade substantially uniformly over large lengths of the cable, may suffer from a single point failure or may be subject to a distributed failure such as water treeing. The insulation resistance measurements allow information relating to the nature of the failure to be derived, and it is possible to control the applied bias signal depending upon the nature of the fault to optimise rejuvenation of the cable.

As mentioned above, the primary purpose of the current limiting resistor 3 is, to ensure that in the event that the insulation resistance falls to a low level, the applied bias voltage signal does not result in the generation of an excessively high current. In practise, the current limiting resistor 3 and the insulation resistance form a potential divider. For half of the applied bias voltage to be dropped across the insulation, the insulation resistance would need to fall to a level substantially equal to the resistance of the current limiting resistor 3. A secondary purpose of the current limiting resistor 3 is to ensure that in the event that the insulation resistance falls to a low level, the applied bias voltage signal does not result in the generation of an excessively high current.

Figure 5:
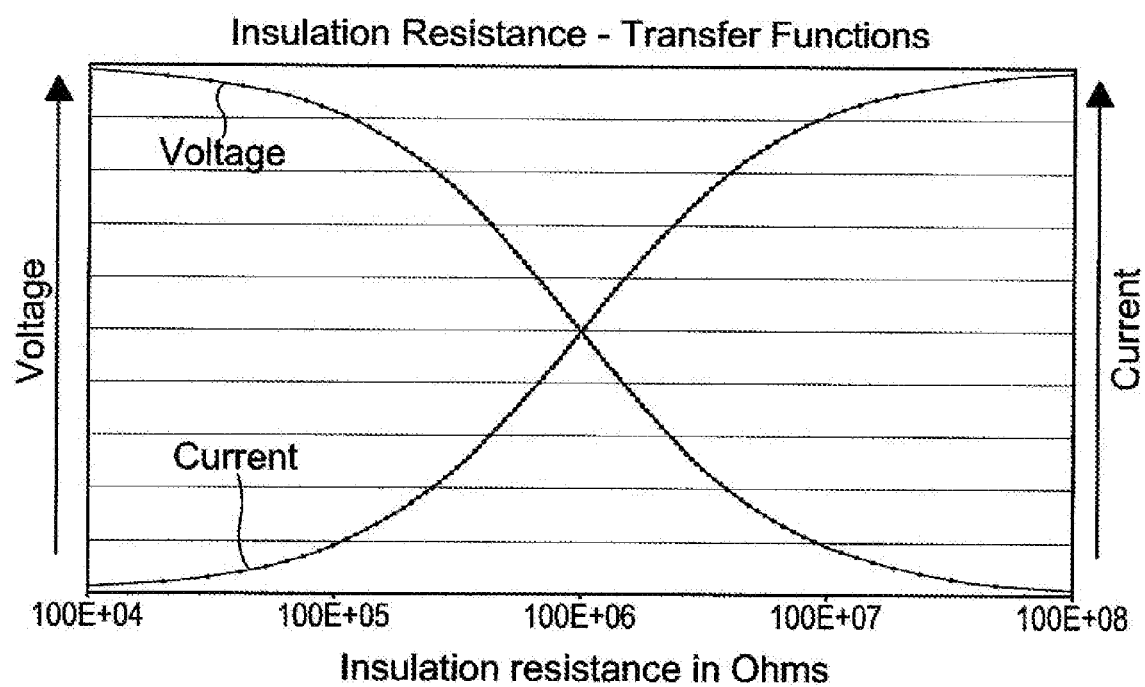
FIG. 5 is a diagram illustrating the relationship between the voltage and current with varying insulation resistance levels.

FIG. 5 illustrates the relationship between the applied bias voltage and current signals and the insulation resistance, showing that whilst the insulation resistance is high, the application of a large bias voltage signal will only result in the supply of a small current. As the insulation resistance drops, for example as a result of degradation thereof, to avoid the supply of an excessive current, the applied bias voltage signal will need to be reduced.

It will be appreciated that an operator will be able, to predict, based upon the design of the system and insulation resistance measurements taken over time, an expected lifetime for the cable, and by how much the lifetime can be increased by the use of the invention.

The specific embodiment describes the use of an appropriately configured V-LIFE as a cable healing or rejuvenation apparatus, but as mentioned hereinbefore any other suitable equipment may be used.

The use of the cable rejuvenation process described hereinbefore inevitably causes a slight reduction in conductor material over time due to the electrochemical reaction between the conductor material and the water of the subsea environment. It should be noted that the loss of conductor material only occurs in the event of an electrochemical reaction occurring, and this is only promoted in the event that the insulation resistance has fallen to an unacceptably low level. The reduction in conductor material is negligible, and the cable healing or rejuvenation method may further be optimised to achieve an appropriate balance between improving insulation properties while minimising loss of conductor material. For example, the cable healing method may be optimised by appropriate configuration of the duration of the bias voltage application, but also the polarity, amplitude and waveform shape of the bias voltage. Suitable waveforms may include sinusoidal, triangular and square waves, for example. The amount of conductor material loss, and the impact of this loss upon the predicted lifetime of the cable, can be determined by the operator and used in determining an appropriate point in time for replacement of the cable.

Although the description hereinbefore relates to the rejuvenation of cables with copper conductors, the invention is not restricted in this regard and may be applied to other forms of cable. By way of example, it may be applied to cables having aluminium conductors. In the case of cables with aluminium conductors, the electrochemical reaction may promote the formation of an $Al_2O_3$ barrier material layer. A different magnitude of bias signal may be required to promote the occurrence of this reaction.

Whilst the description hereinbefore relates primarily to the application of a bias signal to promote an electrochemical reaction that serves to generate a barrier material which enhances or restores the insulating properties of the insulation associated with a cable, the application of the bias signal may additionally or alternatively serve to restore or enhance the insulating properties of the insulation by a number of other mechanisms. By way of example, the application of the bias signal will result in an electro-kinetic electrophoresis effect. Obviously, the movement or migration of the $Cu^+$ and $Cl^-$ ions outlined hereinbefore can be regarded as an electro-kinetic effect, materials being positively driven from one location to another. In another form of electro-kinetic effect, known as electro-osmosis, the application of the bias signal drives liquid within the insulation away from the conductor and thereby reducing leakage currents and so enhancing the insulation resistance. This may occur in conjunction with or as an alternative to the previously described effects. Diffusion and/or electrolysis may further assist in enhancing the insulation resistance upon the application of the bias signal.

In the description hereinbefore the cable forms part of a subsea hydrocarbon production system. It will be appreciated, however, that the invention is not restricted in this regard. By way of example, the cable could be associated with an offshore windfarm, or it could comprise a subsea located communications or power cable, or other subsea located cable.

Whilst specific embodiments of the invention are described hereinbefore, it will be appreciated that a number of modifications and alterations may be made thereto without departing from the scope of the invention, as defined by the appended claims.

The invention claimed is:

1. A cable rejuvenation apparatus for rejuvenating a subsea environment cable, the cable comprising an electrically conducting element sheathed by an electrically insulating material which shields the electrically conducting element from the subsea environment, wherein the cable rejuvenation apparatus is configured to generate and apply a bias signal to the electrically conducting element of the cable, while the cable is located in the subsea environment, the cable rejuvenation apparatus comprising:
   a bias signal generator including an AC voltage source and a DC voltage source, wherein the bias signal generator is configured to combine the AC and DC voltage sources to generate the bias signal such that the bias signal comprises a bias voltage with a time varying component and a magnitude;
   a line insulation monitor configured to monitor insulation resistance properties of the cable; and
   a control unit configured to control the operation of the bias signal generator in order to generate the bias signal to improve the insulation resistance properties of the cable by promoting an electrochemical reaction generating a barrier material tending to reduce electrical current flow between the electrically conducting element and seawater of the subsea environment,
   wherein the control unit is further configured to control the bias signal generator to control the rate of the electrochemical reaction to ensure that the barrier material is maintained at a level sufficient to maintain the insulation resistance properties within an acceptable range, and
   wherein the control unit is further configured to control the AC and DC voltage sources for controlling the time varying component and the magnitude of the bias voltage, respectively, based on the monitored insulation resistance properties from the line insulation monitor in order to maintain the insulation resistance properties within the acceptable range.

2. The cable rejuvenation apparatus according to claim 1, wherein the bias signal generator is configured to apply the bias voltage between the electrically conducting element of the cable, and ground, in which the ground is provided at least in part by the seawater in the subsea environment and/or a further electrically conducting element of the subsea environment cable.

3. The cable rejuvenation apparatus according to claim 1, wherein the apparatus further comprises a current limiting resistor configured to limit the magnitude of a leakage current arising from the application of the bias voltage.

4. The cable rejuvenation apparatus according to claim 1, wherein the time varying component is one of: sinusoidal, square, triangular in waveform.

5. The cable rejuvenation apparatus according to claim 1, wherein the apparatus is configured to apply the bias voltage for a predetermined period of time to enhance the insulation resistance properties of the cable.

6. The cable rejuvenation apparatus according to claim 1, wherein the cable rejuvenation apparatus is configured to apply the bias voltage at a predetermined amplitude to enhance the insulation resistance properties of the cable.

7. The cable rejuvenation apparatus according to claim 1, wherein the bias signal comprises a bias current signal.

8. The cable rejuvenation apparatus according to claim 1, wherein the cable rejuvenation apparatus is further configured to:
   conduct a sequence of measurements upon the subsea environment cable to determine insulation resistance of the subsea environment cable and variations in resistance over time; and
   control the bias signal based on the measured insulation resistance.

9. The cable rejuvenation apparatus according to claim 1, wherein the cable rejuvenation apparatus is configured to select the bias signal depending upon the material of the electrically conducting element, wherein the electrically conducting element comprises copper or aluminum.

10. The cable rejuvenation apparatus according to claim 1, wherein the cable rejuvenation apparatus is configured to select the bias voltage to enhance the insulation resistance properties of the cable, maintaining a reaction initiation voltage of between 1V and 300V across the insulating material at a fault location.

11. The cable rejuvenation apparatus according to claim 10, wherein the cable rejuvenation apparatus is configured to arrange the bias voltage to maintain a reaction initiation voltage of between 2V and 150V across the insulating material at the fault location.

12. The cable rejuvenation apparatus according to claim 11, wherein the cable rejuvenation apparatus is configured to arrange the bias voltage to maintain a reaction initiation voltage of between 4V and 75V across the insulating material at the fault location.

\* \* \* \* \*